(12) United States Patent
Shafer

(10) Patent No.: US 6,437,927 B1
(45) Date of Patent: Aug. 20, 2002

(54) BIOPTIC LENS COVER AND PROTECTOR

(76) Inventor: Larry Lee Shafer, 610 E. South St., New Harmony, IN (US) 47631-0381

( * ) Notice: Subject to any disclaimer, the term of this patent is extended or adjusted under 35 U.S.C. 154(b) by 0 days.

(21) Appl. No.: 09/794,571

(22) Filed: Feb. 27, 2001

Related U.S. Application Data

(60) Provisional application No. 60/198,350, filed on Apr. 18, 2000.

(51) Int. Cl.$^7$ .............................. G02B 3/00; G02C 1/00
(52) U.S. Cl. ...................................... 359/810; 351/158
(58) Field of Search .................. 359/810, 399, 359/405, 424, 425, 830; 351/158

(56) References Cited

U.S. PATENT DOCUMENTS

| | | | | |
|---|---|---|---|---|
| 4,714,329 A | * | 12/1987 | Hellstrom | ................... 351/158 |
| 4,865,438 A | * | 9/1989 | Wada | ........................ 351/158 |
| 5,052,782 A | * | 10/1991 | Myer | ........................ 359/827 |
| 6,371,612 B2 | * | 4/2002 | Barrows | ...................... 351/48 |

\* cited by examiner

*Primary Examiner*—Georgia Epps
*Assistant Examiner*—Saeed Seyrafi
(74) *Attorney, Agent, or Firm*—George H. Morgan; Mark A. Manley

(57) ABSTRACT

A bioptic lens protector comprising a tube, a lens, and a backstop. The lens is contained between the backstop inserted into the tube and a ledge of the tube. The tube attaches to a bioptic lens. A tinted lens can be used to protect the eyes of a light sensitive person wearing bioptic lenses with attached bioptic lens protectors.

10 Claims, 2 Drawing Sheets

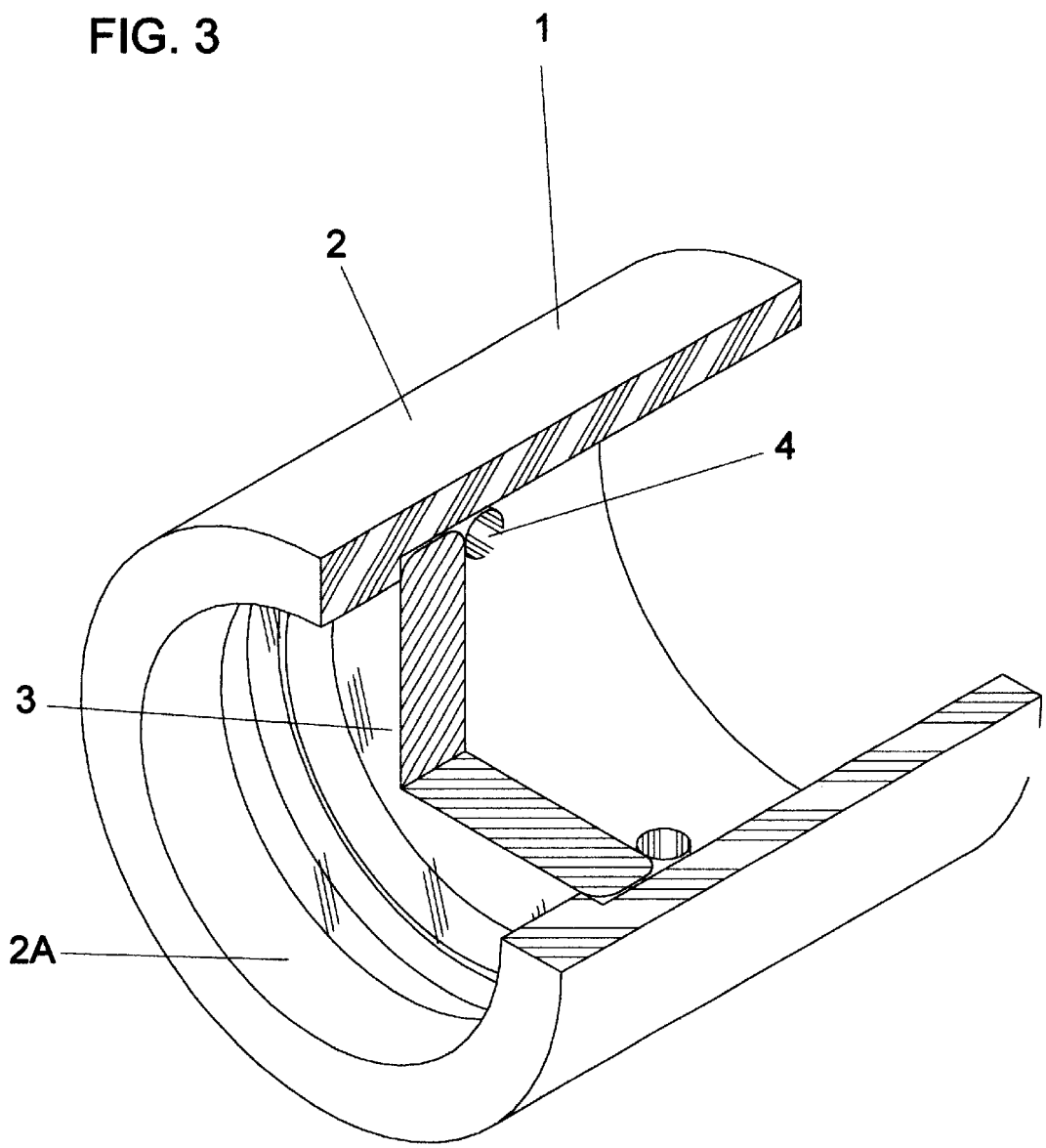

BIOPTIC LENS COVER AND PROTECTOR

CROSS REFERENCES TO RELATED APPLICATIONS

Provisional Application for Patent No. 60/198,350 of Apr. 18, 2000 with the same title, "Bioptic Lens Cover and Protector" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

This invention relates to a device that when attached to a bioptic lens serves to cover and protect the bioptic lense. It comprises a lens that is easily changed in the event of lens contamination. Also, a tinted lens can be installed which is beneficial at times, especially for people with light sensitivity problems.

2. Background Information

Applicant is required to wear bioptic lenses when driving. On a sunny day, sunlight is a problem for applicant's eyes, so a felt need developed for a means of shading applicant's eyes from sun rays. Applicant was unable to find anything.

Also, bioptic lenses are very expensive, and better protection from dust, scratches and breakage is desirable. When bioptic lenses are installed in a pair of glasses, as shown in FIG. 2, if the glasses are dropped, or set down. the weight of the bioptic lenses tends to cause the biopitic lenses end up face down on the resting surface which scratches and damages the lenses.

Also, surgeons wearing bioptic lenses while operating have a problem with blood splatter on lenses, on occasion.

As will be seen from the subsequent description, the preferred embodiments of the present invention overcome these and other shortcomings of prior art.

SUMMARY OF THE INVENTION

The present invention is a device which is a bioptic lens protector, which in the preferred embodiment comprises a tube, a lens, and a backstop. The lens can be clear, tinted, or photo-reactive. The tube comprises a ledge. The lens is held in position against the ledge by the backstop, which in the preferred embodiment of the present invention is an elastomeric o-ring which is retained in the tube by friction. In the preferred embodiment, the tube is an elastomeric tube which is held in place on a bioptic lens by friction. The tube is sized so the tube is slightly stretched when inserted on a bioptic lens. This arrangment permits easy lens changing.

BRIEF DESCRIPTION OF THE DRAWINGS

FIG. 3 illustrates a cross sectional veiw of the lens protector.

DESCRIPTION OF THE PREFERRED EMBODIMENTS

Figure 1:
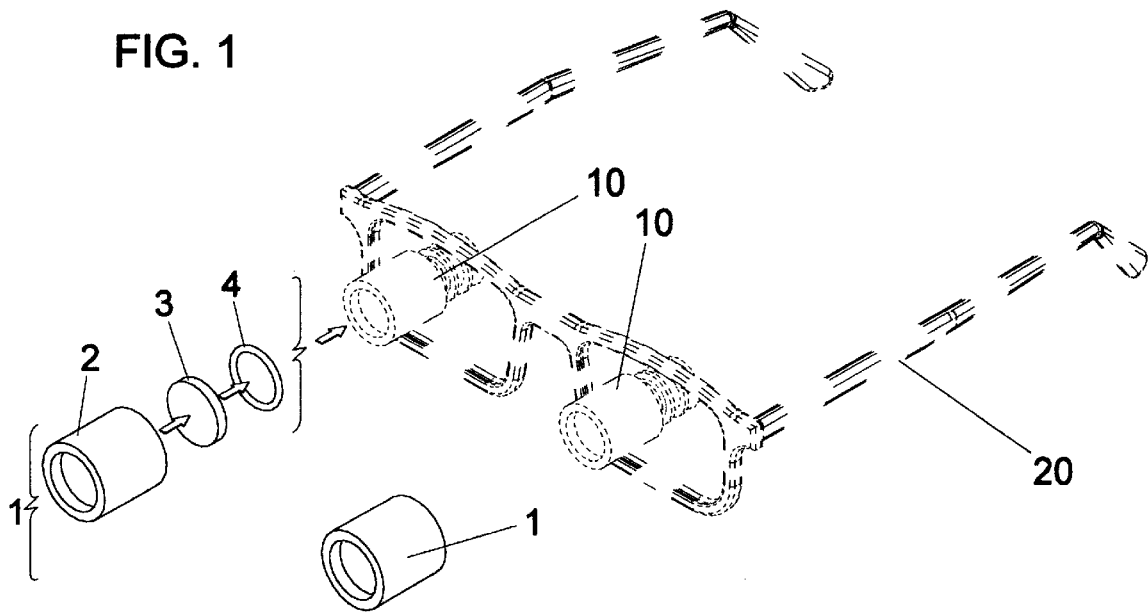
FIGS. 1 and 2 illustrate a preferred embodiment of the present invention, a lens protector.
Figure 2:
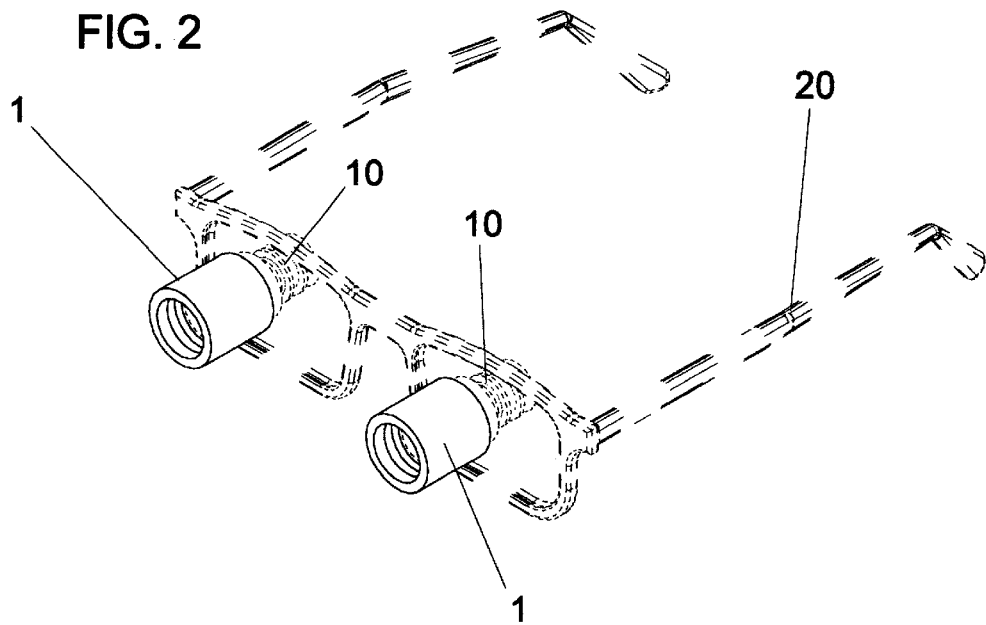

FIGS. 1, 2, and 3 illustrate the preferred embodiment of the present invention, a device which serves as a bioptic lens protector, said device being a lens protector 1 comprising a tube 2, a lens 3, and a backstop 4. The tube 2 comprises a ledge 2a.

In the preferred embodiment of the present invention, the tube 2 is of an elastomeric material such as rubber. The tube 2 is sized so it can be installed in position on a prior art bioptic lens 10 (Ref. FIG. 2), being stretched slightly in the process, so the tube 2 is gripping the bioptic lens 10 with sufficient grip to hold itself in position on the bioptic lens 10.

The lens 3 would normally be a non-prescription lens while the bioptic lens 10 would normally be a prescription or a magnifying lens.

In the preferred embodiment of the present invention, the backstop 4 is an elastomeric O-ring which is insertable into the tube 2 with a slight interference fit and will stay in position and hold the lens 3 in position.

Referring to FIG. 3, the lens protector 1 is assembled by inserting the lens 3 into and through the tube 2 until the lens 3 is in position against the ledge 2a. The backstop 4 is then inserted into and through the tube 2 until the backstop 4 is in position against the lens 3. With proper backstop 4 sizing, so there is a slight interference fit with respect to the tube 2, the lens 3 will be contained in position between the backstop 4 and the ledge 2a.

Lens protectors 1 are installed on the bioptic lenses 10 shown installed in prior art glasses 20 as shown in FIG. 2.

When placing the glasses 20 on a surface, or in the event the glasses are dropped, the lens protectors 1 serve to prevent damage to the bioptic lenses 10. Preventing damage to the bioptic lenses 10 is desirable because the cost of replacement of damaged bioptic lenses 10.

For a near-sighted person who needs bioptic lenses 10 installed in glasses 20, the lens protector 1 can be quickly fitted with a lens 3 which is a tinted lens, for protection of his eyes from sun damage. When the danger from sun damage is not there, the lens 3 which is tinted can be easily replaced with a lens 3 that is a clear lens. Also, in the preferred embodiment of the present invention, the lens 3 could be a photo-reactive lens, i.e. a lens that is normally clear but turns darker when exposed to light.

Surgeons wearing bioptic lenses 10 with lens protectors 1 as shown in FIG. 2, while performing surgical procedures, in the event of blood splatter, can effect a quick replacement of their lens protectors 1 with minimal interruption of their surgical procedures. Lens protectors 1 serve as lens covers and protectors.

Although the description above contains many specificities, these should not be construed as limiting the scope of the invention but as merely providing illustrations of some of the presently preferred embodiments of this invention.

As an example, the backstop 4 does not have to be an elastomeric o-ring. A square cut ring, or some other shape might suffice. Also, some other material than an elastomer such as plastic or perhaps a soft metal might serve, albeit not necessarily as well.

Similarly, while an elastomer was specified as the material for the preferred embodiment of the tube 2, as obvious to anyone skilled in the art, other materials might suffice, albeit perhaps not as well.

Also, in the preferred embodiment, the lens protector 1 grips the bioptic lens 10 and is retained in position on the bioptic lens 10 by friction. As obvious to anyone skilled in the art, there are many ways to affix the lens protector 1 to the bioptic lens 10 albeit perhaps not necessarily as simply as the preferred embodiment disclosed.

It will be obvious to those skilled in the art that modifications may be made to the embodiments described above without departing from the scope of the present invention.

Thus the scope of the invention should be determined by the appended claims in the formal application and their legal equivalents, rather than by the examples given.

I claim:

1. A bioptic lens protector comprising:

a tube, said tube further comprising a ledge, a protective lens, a backstop, wherein the protective lens is contained between said ledge and said backstop and wherein said tube is installed on bioptic lens to be protected.

2. The bioptic lens protector of claim 1 wherein said tube is of a material and sized so said tube can be stretched slightly so that said tube fits over said bioptic lens and grips said bioptic lens with sufficient force to stay in place on said bioptic lens.

3. The bioptic lens protector of claim 1 wherein the protective lens is a non-prescription lens.

4. The bioptic lens protector of claim 1 wherein the protective lens is tinted.

5. The bioptic lens protector of claim 1 wherein the protective lens is a non-prescription, photo-reactive lens.

6. The bioptic lens protector of claim 1 wherein the backstop is of elastic material sized for an interference fit with an inside diameter of said tube to hold the protective lens in place within the tube.

7. A protective device for protecting a prescription bioptic lens comprising;

a tube, a protective lens, wherein the protective lens is contained within the tube and wherein the tube is sized to slip fit over the bioptic lens and wherein the tube maintains a friction fit with said bioptic lens and wherein said protective lens covers said prescription bioptic lens.

8. The protective device of claim 7 wherein the protective lens is tinted.

9. A protective device for a cylindrical bioptic lens attached to glasses, the protective device comprising;

a tube, a protective lens, wherein the protective lens is contained within the tube and wherein the tube is sized for interference fit over the cylindrical bioptic lens and wherein the tube maintains a friction fit with said cylindrical bioptic lens and wherein said protective lens covers said cylindrical bioptic lens.

10. The protective device of claim 9 wherein the tube is rubber.

* * * * *